INVENTOR.
HERMAN AINIS
BY
Lyon & Lyon
ATTORNEYS

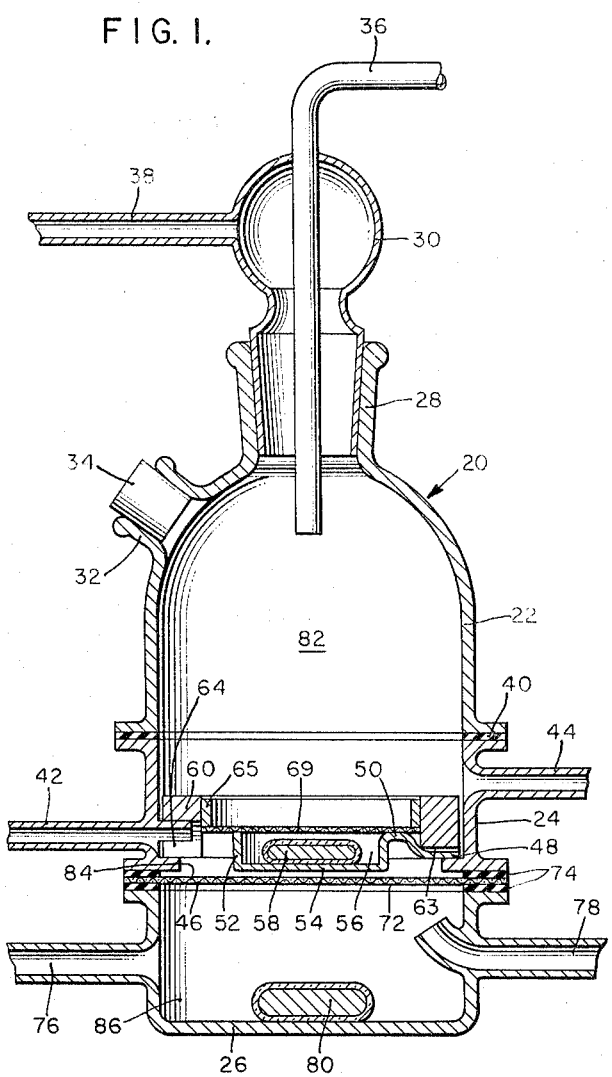
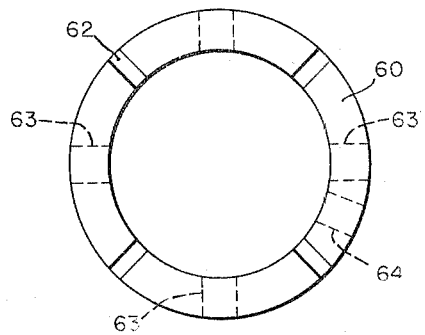
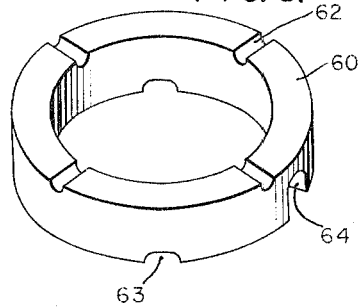
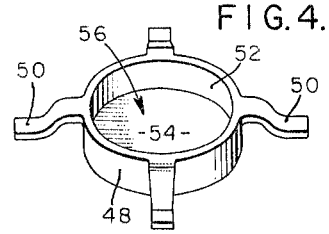
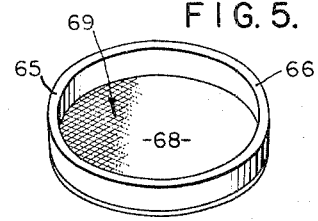
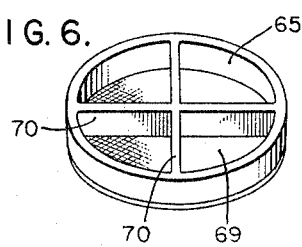
INVENTOR.
HERMAN AINIS
BY
ATTORNEYS Sept. 27, 1966    H. AINIS    3,275,528
METHOD AND APPARATUS FOR CONTROLLING CULTURE GROWTH
Filed March 30, 1961    2 Sheets-Sheet 2

United States Patent Office 3,275,528
Patented Sept. 27, 1966

3,275,528
METHOD AND APPARATUS FOR CONTROLLING CULTURE GROWTH
Herman Ainis, Denver, Colo., assignor to California Institute Research Foundation, Pasadena, Calif., a corporation of California
Filed Mar. 30, 1961, Ser. No. 99,463
2 Claims. (Cl. 195—104)

This invention relates to a method of establishing an environment which will permit cells, tissues or organs to continue to perform their normal physiological functions when explanted and to an apparatus within which such an environment may be maintained.

Classically, antibody materials are obtained by injecting a suitable antigen into a host animal and then removing the blood from the animal and extracting the antibody therefrom. In this procedure only a limited amount of antibody can be obtained and difficulties are occasionally encountered in obtaining the antibody in the pure state. It has long been held to be theoretically possible to separate a particular antibody producing organ from the host animal and establish an environment in which the selected organ would effectively live.

There have been many efforts made to develop a method or establish an environment wherein explanted tissue would survive and continue to perform its normal physiological function. Failure to achieve these results has been generally attributed to the contamination of the environmental area with substances detrimental to cell or tissue growth.

It is an object of the present invention to provide a method by which an environment favorable to normal physiological function may be established for explanted cells, tissues and organs.

It is a further object of the present invention to provide such a method wherein desirable by-products produced by explanted tissue and the like may be continuously recovered.

It is a further object of the present invention to provide an apparatus suitable for use in such method.

Figure 8:
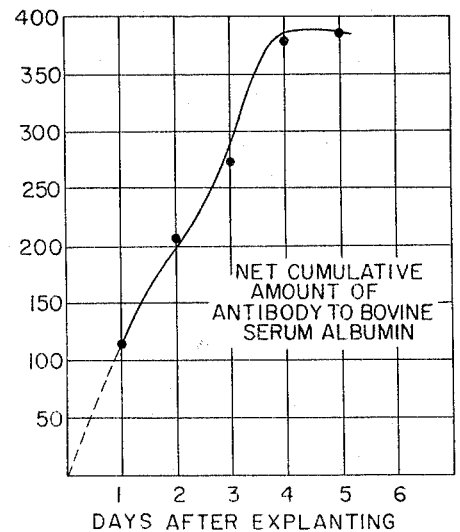
Figure 7:
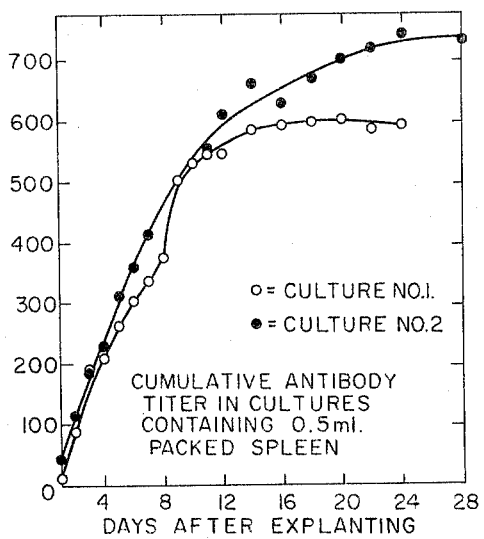

Other objects and advantages of the present invention will be readily apparent to those skilled in the art from the following detailed description of a preferred embodiment thereof when taken in connection with the accompanying drawings in which FIG. 1 is a vertical sectional view of the apparatus.
FIG. 2 is a top plan view of the ring support.
FIG. 3 is a perspective view of the ring support.
FIG. 4 is a perspective view of the magnet holder.
FIG. 5 is a perspective view of one form of a filter ring.
FIG. 6 is a perspective view of a modified form of the filter ring.
FIG. 7 is a graphic illustration of the amount of antibody recovered in one experiment utilizing the present method and apparatus.
FIG. 8 is a further graphic illustration illustrating the recovery of antibody in further experiments.

Referring now to the drawings, the apparatus of the present invention is shown generally at 20. The apparatus is preferably made of glass or other impervious or non-reacting material and includes an upper section 22, a middle section 24 and a lower section 26.

The upper section 22 is provided with a neck 28, adapted to receive a gas exchange apparatus 30. The section 22 is further provided with a side opening 32 which may be closed by a suitable stopper 34. The gas exchange apparatus 30 includes a gas inlet tube 36 and a gas outlet tube 38.

The upper section 22 is separated from the center section 24 by a rubber gasket 40 which provides a gas-tight seal at the juncture of the upper and center sections.

The center section 24 is provided with a fluid inlet bore 42 and a fluid outlet bore 44. Within the section 24 is a peripheral rib 46 which supports a holder member 48. The holder member 48 is provided with a plurality of arms 50, side wall 52 and bottom 54. The wall 52, which is circular, and the bottom 54 cooperate to form a well 56 which carries a glass covered magnet 58.

Above the holder member 48 is a filter ring support 60. The ring support 60 is provided with a plurality of upper and lower grooves 62 and 63. The lower grooves 63 fit over the arms 50 thus immobilizing the holder member 48. The upper grooves 62 facilitate the flow of fluid. The ring support 60 is further provided with a lower groove 64 which fits over the inlet bore 42 thus positioning the holder member 48 and preventing obstruction of the inlet bore 42. Within the ring support 60 is a filter ring 65. As shown in FIGURES 5 and 6 of the filter rings, while generally cylindrical in appearance, may be formed in different ways, depending upon the material to be carried. The ring support 60 positions the filter ring 65 within the center section 24 while the bottom of the filter ring is supported by the arms 50.

The side wall 66 of the filter ring 65 is preferably formed of glass while the bottom 68 is in the form of a millipore filter 69. This millipore filter has openings of the order of ½ to 1 micron thereby permitting the passage of relatively large molecules, i.e., insulin, while at the same time preventing cells and the like from passing therethrough.

As shown in FIG. 6, the filter ring 65a may be divided into a plurality of compartments by cross-members 70.

The center section 24 and lower section 26 are separated by a dialyzing membrane 72 held by a suitable gasket 74 at the juncture of the center and lower sections. The dialyzing membrane has openings of the order of 5 to 10 angstroms which prevents the passage therethrough of large molecules, i.e., insulin, but which readily passes small molecules, i.e., urea. The lower section 26 is provided with a fluid inlet opening 76 and a fluid outlet opening 78. Within the lower section is a second glass covered magnet 80.

From the above description of the apparatus which may be used in practicing the method of the present invention it will be apparent that three chambers are provided for, i.e., a gas chamber 82, a first fluid chamber 84 and a second fluid chamber 86.

In accordance with the method of the present invention, explanted tissues or the like are subjected to a gaseous atmosphere compatible therewith and treated with a suitable liquid medium to provide the necessary nutrients whereby the cells or tissues are maintained in a living state. The medium is continuously mixed or stirred in and about the material to maintain the solution in the first fluid chamber substantially homogeneous. The medium is continuously and slowly removed from the first liquid chamber which medium will include at least part of the products produced by said material. A selected medium is passed through the second fluid chamber with constant stirring to extract small molecule by-products of the material from the first fluid chamber. Finally, the values are recovered from the medium extracter from the first fluid chamber by any suitable means.

It will be apparent that for so long as the cells or tissues held by the filter ring retain their normal physiological functions, such materials will produce by-products which are normally disposed of by the body, such as, for example, urea, antibodies and the like.

In order to prevent a build up in concentration of such materials in the first fluid chamber, the liquid therein is constantly stirred by the magnet 58, suitable power means (not shown) being provided to cause the magnet to rotate. By the stirring, chemical by-products produced by the cells or tissues will be continuously extracted therefrom and substantially uniformly distributed through the first fluid chamber.

As previously set forth, the millipore filter 69 permits the passages of by-products produced by the cells or tissues so that such by-products may be extracted from these materials from above and below. By permitting a suitable medium to flow into the second fluid chamber 86, contaminants, such as urea and other small molecule by-products, are continuously removed. The pH of the medium in contact with the cells can be adjusted and controlled by adjusting the pH of the medium flowing into the first fluid chamber.

It will be apparent that various gas mixtures and gas concentrations may be passed through the chamber 82.

By constant stirring of the medium in the first fluid chamber, the incoming medium is dispersed constantly and mixed with the medium in contact with the cells maintaining a constant concentration of all essential metabolites.

The following are specific examples of the process of the present invention and the use of the apparatus.

EXAMPLE I

A rabbit was immunized with 1 percent hemocyanin obtained from the giant keyhole limpet. Subsequently the immunized animal was sacrificed and the spleen obtained and broken up into single cells and small clumps. This material was placed into a filter ring 65 through the side opening 32. The three chambers 82, 84, and 86 were maintained at a temperature of 37° C. The gas chamber 82 was swept with commercial oxygen and then a mixture of 95 percent oxygen and 5 percent $CO_2$ was permitted to flow into the gas chamber at a rate of 10 ml. per minute. A Modified Eagles medium was introduced into the first and second fluid chambers, the rate of fluid exchange in the first fluid chamber being approximately 10 ml. a day and the flow rate in the second fluid chamber being regulated to between 75 and 100 ml. per day. The Modified Eagles medium had the following composition:

| Salts: | Mg./liter |
|---|---|
| NaCl | 6400 |
| KCl | 400 |
| $CaCl_2$ | 200 |
| $MgSo_4 \cdot 7H_2O$ | 200 |
| $Na_2HPO_4 \cdot 7H_2O$ | 125 |
| $NaHCO_3$ | 3700 |
| $Fe(NO_3)_2$ | 0.1 |
| l-amino acids: | |
| Arginine | 168 |
| Cytine | 96 |
| Glutamine | 293 |
| Histidine | 84 |
| Isoleucine | 210 |
| Leucine | 210 |
| Lysine | 292 |
| Methionine | 60 |
| Phenylalanine | 132 |
| Threonine | 190 |
| Tryptophane | 32 |
| Tryosine | 145 |
| Valine | 187 |
| Vitamins: | |
| Choline chloride | 4 |
| Nicotinamide | 4 |
| Calcium pantothenate | 4 |
| Pyridoxal·hydrochloride | 4 |
| Riboflavin | 4 |
| Thiamine | 4 |
| i-Inositol | 7 |
| Folic acid | 4 |
| Carbohydrates: | Mg./liter |
| Glucose | 4500 |
| Miscellaneous: | |
| Penicillin, mg./liter | 0.5 |
| Phenol red, mg./liter | 20 |
| Insulin, mg./liter | .0005 |
| Homologous rabbit serum, percent | 28 |

The antibody concentration in the medium removed from the first fluid chamber was determined by quantitative precipitin techniques and the amount produced during periodic intervals as well as the cumulative quantity produced was calculated. The results of the first example are set forth in FIG. 7.

EXAMPLE II

The steps of Example I were repeated. However, the rabbit was immunized with 1 percent bovine serum alubmin, the spleen obtained and treated as in Example I. Antibody obtained is shown in FIG. 8.

Antibody may be continuously recovered by the antibody isolation techniques described in the patent to Campbell, Patent No. 2,957,808 for "Process for the Isolation of Diagnostic and Immunizing Proteinaceous Materials."

It will be apparent to those skilled in the art that different gas concentrations and compositions may be introduced into the gas chamber depending on the nature of the cells being treated. For example, it has been determined that liver cells will deteriorate rapidly if the oxygen concentration is as high as 95 percent whereas spleen cells grow readily at this concentration. Further, it will be seen that several organs may be grown in intimate proximity of each other, or separated from each other whereby interaction is obtained through the soluble products. In the latter case a filter ring as shown in FIG. 6 may be used.

The temperature of incubation may be varied from 30° C. to 45° C. or higher, and the composition of the medium may be varied by, for example, the addition of various vitamins for improvement in protein synthesis, again depending on the cells being treated.

In some cases two or more chambers may be connected in series so that tissues or organs requiring different gas concentrations or media may be interacted through soluble substances passing from one to the other.

By the use of the apparatus and process above described, tissues may be treated in an environment of homogeneous and constant chemical character preventing tissue shock which was inherent in apparatus of the prior art. An examination of the media removed from the second fluid chamber demonstrated that the apparatus and method effectively removed contaminating chemicals formed by the cells. By the techniques above described a wide variety of organ and cell by-products such as, for example, insulin, obtained from the islet cells of the pancreas may be continuously recovered.

Having fully described my invention, it is to be understood that I do not wish to be limited to the precise details of the examples set forth but my invention is of the full scope of the appended claims.

I claim:

1. An apparatus for controlling culture growth comprising a housing including a gas chamber, a first fluid chamber positioned adjacent to said gas chamber, a second fluid chamber positioned adjacent to said first fluid chamber, means for circulating gas in and through said gas chamber, means for circulating fluid in and through said first fluid chamber, means for circulating fluid through said second fluid chamber, a first porous means positioned in said first fluid chamber and separating said gas chamber from said first fluid chamber, said first porous means having a pore size sufficient to pass molecules having a size on the order of that of insulin but insufficient to pass cells, and a second porous means positioned in said second fluid chamber and separating said second fluid chamber from said first fluid chamber, said porous means having a pore size sufficient to pass molecules having a size on the order of urea, but insufficient to pass molecules having a size on the order of insulin.

2. A method of controlling tissue growth in an apparatus having a gas chamber, a first fluid chamber and a second fluid chamber, said first fluid chamber being provided with a porous means separating said gas chamber from said first fluid chamber and having a pore size sufficient to pass molecules having a size on the order of insulin, but insufficient to pass cells, said second fluid chamber being provided with a porous means separating said first fluid chamber from said second fluid chamber and having a pore size sufficient to pass molecules having a size on the order of urea, but insufficient to pass molecules having a size on the order of insulin, comprising the steps of placing explanted cells in said first fluid chamber, subjecting said cells to a gaseous atmosphere compatible therewith, slowly passing a nutrient medium through said first fluid chamber and bathing said cells with said medium, slowly passing a like medium through said second fluid chamber whereby by-products having a size sufficiently small to pass through said second porous means are removed from said first fluid chamber, and collecting medium passed through said first fluid chamber whereby cell by-products having a size too large to pass through said second porous means are obtained.

References Cited by the Examiner

UNITED STATES PATENTS

| | | | |
|---|---|---|---|
| 2,658,021 | 11/1949 | Earle | 167—84.5 |
| 2,975,553 | 3/1961 | Paul | 47—1 |
| 2,990,335 | 6/1961 | Earle | 167—84.5 |
| 2,990,339 | 6/1961 | Frank | 195—139 |

OTHER REFERENCES

Millipore: 1957 Supplement, Millipore Filter Corp., Watertown, Mass., pp. 4–5.

Steiner et al.: Proceedings of the National Academy of Science, vol. 42, 1956, pp. 580–586. Available at the U. S. Department of Agriculture Library.

LEWIS GOTTS, *Primary Examiner.*

MORRIS O. WOLK, *Examiner.*

P. L. SABATINE, R. HUFF, *Assistant Examiners.*